March 6, 1934. C. B. McDONALD 1,949,614

VALVE SEAT RETAINING MEANS

Filed Dec. 18, 1930

INVENTOR
Charles B. McDonald.
BY
Harness Dickey Pierce & Hann
ATTORNEYS.

Patented Mar. 6, 1934

1,949,614

UNITED STATES PATENT OFFICE 1,949,614

VALVE SEAT RETAINING MEANS

Charles B. McDonald, Detroit, Mich., assignor to Wilcox-Rich Corporation, a corporation of Michigan Application December 18, 1930, Serial No. 503,255

3 Claims. (Cl. 123—188)

The present invention should be understood to relate somewhat broadly to valve seat organizations suitable for use in internal combustion engines, such as those of automotive vehicles; and preferred embodiments of the invention may be understood to contemplate the use, in addition to a replaceable valve seat element, of a split or other ring, adapted to overlie a portion of said seat element and to be retained, as by peening, in a suitable groove provided in a cylinder block, a head block, or the like.

As commented in my pending application, Serial No. 463,081, filed June 23, 1930, much attention has recently been given, in view of the rapid wear to which seats are frequently subjected in high speed motors and especially in heavy duty motors such as those used upon trucks, tractors and busses, to the building up worn valve seats. The problem referred to is, of course, complicated by the fact that the various wear-resistant and corrosion-resistant compositions which are suitable for use as valve seats have generally been found unsuitable, primarily by reason of differences in thermal expansion, to a direct union thereof with cylinder blocks or head blocks; and the present invention resembles that set forth in the mentioned application in that it contemplates the retention of annular valve seats by means obviating all necessity for a direct or permanent union thereof with said blocks; but, whereas the mentioned invention contemplated the use of welding in securing special retainers in grooves bordered by circular edges and adapted to receive both suitable seat elements and said retainers (formed from substantially the same material as the mentioned blocks), the present invention, more elastic in its requirements as to the composition of its retainers, contemplates a retention thereof by a deformation of an edge of one of the parts referred to. For example, each retainer being preferably provided with a suitably beveled or chamfered area adjacent its upper and outer edge, a retention may be effected by peening thereover the adjacent edge of the block,—said edge being suitably formed, for this effect, incidentally to the cutting of the counterbored section which receives said retainer.

It is known that efforts have heretofore been made directly to secure separate seat rings, made from various bronzes and alloys; but, on account of the mentioned differences in rate of thermal expansion between the wear resistant metals found suitable for valve seats and the cast metals used in cylinder blocks, and on account of the directness of the shock thereon, the joints holding these rings became loose very quickly,—said rings sometimes actually falling out when used overhead. Adequate tests have however now established that, in case an intermediate retaining ring having a suitable coefficient of expansion (preferably not far from that of the block receiving the same) is disposed in an overlying relationship to a separately formed valve seat ring, said overlying retaining ring may be satisfactorily secured not only by welding (as described and claimed in the mentioned application) but alternatively by a suitable deformation of, for example, an edge of a groove receiving both of said rings, as above referred to.

Other objects of the present invention, including various alternative and optical features hereinafter described, may be best appreciated from the following description of illustrative embodiments thereof, taken in connection with the appended claims and the accompanying drawing.

Figure 1:
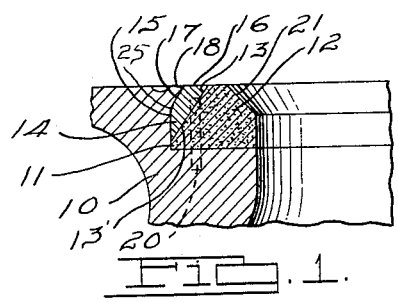
Fig. 1 is a fragmentary half-sectional view, taken through a part of a cylinder block or a head block and through both a seat ring and a retaining ring disposed in a groove at a valve opening therein.
Figure 2:
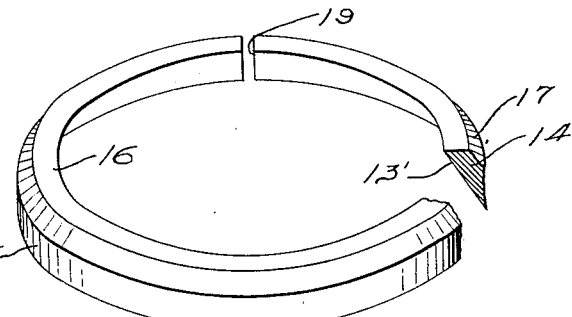
Fig. 2 is a perspective view showing one type of retaining ring suitable for use in the general manner suggested in Fig. 1.

The nature of the present invention, like that of the mentioned application, being such as to require no general view, Fig. 1 will be understood to show a fragment of an engine block 10, such as a cylinder block or a head block, as provided with an annular groove 11, suitable for the reception of either a laterally movable or a normally immovable but replaceable seat element,—the seats 12 being formed from any special bronze or steel or other alloy known to be, or hereafter found to be, suitable to withstand the rigorous conditions of its indicated use; and this seat element is shown as provided with a substantially conical outer surface 13, adapted to cooperate with a special retaining element in the form of a ring or annulus 14. The latter, whether uninterrupted or split in the general manner suggested in Fig. 2, will be seen to provide, in addition to an outer and optionally cylindrical surface 15 and an upper or exposed surface 16, a substantially conical but concave surface 13', opposable to the mentioned surface 13.

Features similar to those above referred to being shown in the mentioned prior application, it will be noted that, in the present instance, the ring 14 is additionally provided with a beveled or chambered surface 17 (optionally substantially parallel with the mentioned concave surface 13') at the upper and outer edge of said ring,—the surface 17 being disposed suitably for engagement by extensive integral tongues or a continuous rim or flange of metal peened or otherwise deformed thereover from the adjacent upper edge of the groove 11 in the block 10. The exact cross-sectional configuration of any annular inward extension 18, whether formed by peening or by spinning or by other manual or machine operations, may naturally depend not only upon the exact composition of the so-called cast iron or cast steel or other metal or alloy from which the block 10 may be formed, but upon the inclination of the surface 17,—the latter being in turn dependent upon the relationships found most suitable to the secure retention of the ring 14, under the intended conditions of use; but it is suggested in Figs. 1 and 2 that, to obviate necessity for a very exact cutting of the external cylindrical surface 15 of the ring 14, to conform to the inside transverse diameter of the groove 11 or the concave cylindrical wall 15' thereof, the ring 14 (which may ordinarily be formed of a steel having substantially the same composition and/or coefficient of expansion as the block 10, or at least a coefficient of expansion more nearly resembling that of said block than that of the seat element 12) may advantageously be split in a radial or other plane, as at 19; and also that means, such as pins 20 secured in one of the mentioned annular elements or in the bottom of the groove 11, may advantageously be employed to prevent relative rotation of the seat element 12 during any subsequent grinding of a seating surface 21 thereof.

Figure 3:
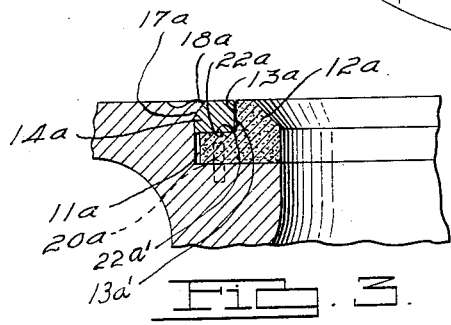
Figs. 3 and 4 are respectively sectional views comparable with Fig. 1, but suggesting alternative forms.

The groove 11a shown in Fig. 3 being similar in configuration to the mentioned groove 11, shown in Fig. 1, the annular retaining element 14a is shown as substantially rectangular in cross-sectional outline, except as it is provided with a chamfered surface at 17a; but this embodiment of the invention will be seen to function similarly to that already described, except as a clearance may be so provided, between substantially cylindrical surfaces at 13a, 13a' and elsewhere, as to permit a so-called "floating" or self-centering of the seat element 12a in self-adaptation to the requirements of any valve element (not shown) engageable therewith,—no avoidable clearance being however intended between cooperating flat surfaces such as are shown at 22a and 22a'.

Figure 4:
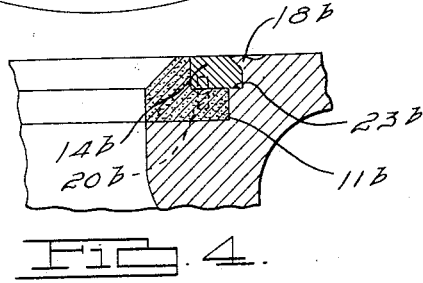

In its more general aspects, the embodiment illustrated in Fig. 4 will be seen to resemble that shown in Fig. 3,—an outstanding difference being the proivision of a "step", as at 23b, in the periphery of the groove 11b,—to accommodate a comparatively broad retaining ring 14b; but the provision of this step and the use of a broad ring may obviously be deferred until the execution of successive peening or like operations has rendered impracticable further employment of narrower rings, such as that shown in Fig. 3. Fig. 4 will be seen additonally to suggest the employment of pins 20b, extending from the seat element 12b only into the retaining ring 14b (the rings 14a and 14b being optionally held stationary by the peened or other inward extensions 18a and 18b of the blocks 10a and 10b) whereas a pin 20a, of the embodiment shown in Fig. 3, extends only from the seat element 12a into the block 10a. But it should be understood that, the described methods of retaining the annular valve seat element being optionally such as may permit some relative movement thereof, any known or preferred means may be employed to obviate relative rotation.

Figure 6:
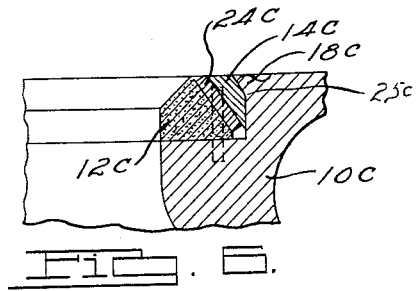
Fig. 6 is a sectional view comparable with Figs. 1, 3 and 4, but suggesting another alternative form.
Figure 7:
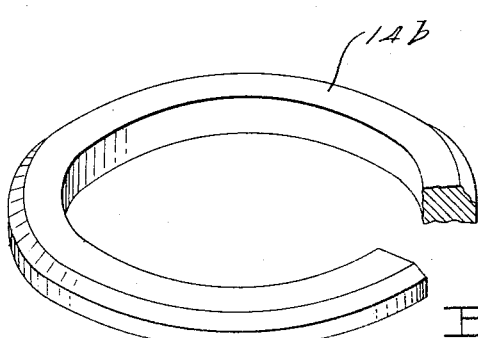
Fig. 7 is a perspective view, similar to Figs. 2 and 5, but showing separately an optional intermediate retaining ring, suitable for use in the general manner suggested in Fig. 6.
Figure 5:
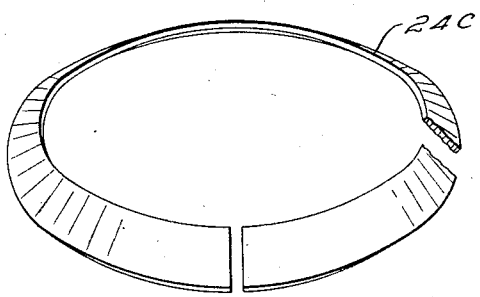
Fig. 5 is a perspective view comparable with Fig. 2, but showing a retaining ring of the type illustrated in Fig. 4.

All of the above described forms will be seen to have in common the advantage of subdividing any annular space that may result, at certain temperatures, from differences in the coefficients of expansion respectively characterizing the seat element and the cast engine block which receives the same; and all will be seen to accomplish this result without necessitating any undercutting of the groove in said block; but it is suggested in Figs. 6 and 7, (and by way of a supplement or extension of this principle of the subdivision of a clearance in order to reduce the effects of any hammer-like strokes in the separation of parts) that, when justified by conditions of intended use, an additional or intermediate annulus 24c may be interposed between a seat element 12c and a retainer 14c,—the latter being shown as resembling the retainer 14 illustrated in Fig. 1. It may not ordinarily be found desirable to give this intermediate element, if employed, any appreciable "weave" for an additional cushioning effect due to its resiliency and further tending to safeguard any peened or other inward extension 18c from the block; but it is suggested that such an intermediate annulus may be formed either from a material intermediate in its rate of thermal expansion between the elements with which it contacts or from a metal whose rate of expansion is so low as to offset any high rate of expansion characterizing the seat element 12c as compared with the retainer 14c and/or the block 10c,—thereby minimizing the low-temperature separation interval referred to as well as further sub-dividing said interval. However, such merit as this embodiment may possess will be seen to be largely independent of the means employed to secure ring 14c; and it should be understood also that the formation of snug-fitting and suitably chamfered seat annuli from metals having substantially the same coefficient of expansion as that of the block receiving the same is found to permit a reliance upon peening directly to retain said annuli,—no interposition of a retaining ring and no welding being absolutely required, and the reliability of a replacement or insertion job of this character being enhanced by the heating of the block and the liquid-air cooling of the annular element to be inserted. In the alternative last referred to, it will be understood that, for example, the elements 12 and 14 of Fig. 1, or the elements 12c, 14c and 24c of the form shown in Fig. 6 may be regarded as integral or united; but any cylindrical outer surface of the insert should always terminate in a rounded or other edge 25 or 25c at a level so spaced below the edge of the groove receiving the same as to permit a peening or like deformation of the latter edge thereover.

In conclusion, it should be understood not only that various features of the present invention might be independently employed but also that numerous modifications, additional to any suggested herein, might easily be devised by skilled workers, if informed of the foregoing,—all without departure from the scope of the present invention, as the latter is indicated above and in the following claims.

What I claim is:

1. In a seat organization suitable for use at a valve opening in an engine block element, said opening being provided with a groove to receive a separate seat element: a seat element of hardened wear and heat resisting material in said groove; and a retaining ring element interposed between a wall of said groove and said seat element and secured by engagement with a flange integrally provided by a deformation of an edge of said groove, said retaining ring element having substantially the same coefficient of expansion as said block element, the seat element having a different coefficient of expansion from the ring and block elements.

2. In a valve seat organization of the general character described: a block element provided with a valve seat opening bordered by a circular edge formed at the upper surface of the block element; a seat element of hardened wear and heat resisting material having an upper edge disposed below said first mentioned edge; and a retaining ring element formed of a material having the same coefficient of expansion as the block element also disposed below said first mentioned edge,—said seat element being in engagement with both said ring element and said block elements and a portion of said block element being so deformed as to secure said seat element in said block element by means comprising said ring element, said seat element and said ring retaining element being provided with cooperating conical surfaces, the seat element having a different coefficient of expansion from the block and retaining ring elements.

3. In a valve seat organization of the general character described: a block element provided with a valve seat opening bordered by a circular edge formed at the upper surface of the block element; a seat element of hardened wear and heat resisting material having an upper edge disposed below said first mentioned edge; and a retaining ring element formed of a material have same coefficient of expansion as the block element also disposed below said first mentioned edge,—said retaining element being provided with a chamfered surface and the circular block element edge being deformed over said surface, the seating element having a different coefficient of expansion from the block and the retaining ring elements.

CHARLES B. McDONALD.